United States Patent
Capelletti et al.

(10) Patent No.: US 12,515,389 B2
(45) Date of Patent: Jan. 6, 2026

(54) METHOD FOR THE PRODUCTION OF EXTRUDED FILAMENTS WITH CONDUCTIVE ELEMENTS

(71) Applicant: EXGINEERING SA, Manno (CH)

(72) Inventors: Tiziano Capelletti, Buguggiate (IT); Simone Maccagnan, Castronno (IT)

(73) Assignee: EXGINEERING SA, Manno (CH)

( * ) Notice: Subject to any disclaimer, the term of this patent is extended or adjusted under 35 U.S.C. 154(b) by 891 days.

(21) Appl. No.: 17/298,926

(22) PCT Filed: Dec. 13, 2018

(86) PCT No.: PCT/IB2018/060001
§ 371 (c)(1),
(2) Date: Jun. 1, 2021

(87) PCT Pub. No.: WO2020/121037
PCT Pub. Date: Jun. 18, 2020

(65) Prior Publication Data
US 2022/0032524 A1  Feb. 3, 2022

(51) Int. Cl.
*B29C 48/156* (2019.01)
*B29C 48/05* (2019.01)
(Continued)

(52) U.S. Cl.
CPC ............ *B29C 48/156* (2019.02); *B29C 48/05* (2019.02); *B29C 48/08* (2019.02); *B29C 48/154* (2019.02);
(Continued)

(58) Field of Classification Search
CPC ..... B29C 48/0022; B29C 48/05; B29C 48/06; B29C 48/154; B29C 48/156;
(Continued)

(56) References Cited

U.S. PATENT DOCUMENTS 3,557,403 A * 1/1971 Lemelson ............ B29C 48/325
425/384
4,250,400 A 2/1981 Lee
(Continued)

FOREIGN PATENT DOCUMENTS

DE  35 09 404  * 9/1986
JP  H08255673 A  10/1996
(Continued)

OTHER PUBLICATIONS

English Translation of KR 10-1756119, Jul. 26, 2017. (Year: 2017).*
English translation of DE 35 09 404. 1986.*

*Primary Examiner* — Xiao S Zhao
*Assistant Examiner* — Joseph S Leyson
(74) *Attorney, Agent, or Firm* — Chrisman Gallo Tochtrop LLC (57) ABSTRACT

A method for the production of filaments (A) capable of being thermoregulated includes the steps of: —feeding a material to be extruded and a pair of wires (B) in electrically conductive material to an extrusion head (1); —extruding the material to be extruded and, at the same time, promoting the escape of the pair of wires (B) from the extrusion head (1) in such a way that the material to be extruded winds the pair of wires (B); —during the extrusion, generating at least a coupling portion (Y) of the filament (A), wherein the pair of wires (B) is electrically connected.

15 Claims, 6 Drawing Sheets

(51) Int. Cl.
  *B29C 48/08*    (2019.01)
  *B29C 48/154*   (2019.01)
  *B29C 48/285*   (2019.01)
  *B29C 48/34*    (2019.01)
  *F16L 53/38*    (2018.01)
  *H05B 3/56*     (2006.01)
  *B29K 705/08*   (2006.01)

(52) U.S. Cl.
  CPC .......... *B29C 48/2883* (2019.02); *B29C 48/34* (2019.02); *F16L 53/38* (2018.01); *H05B 3/56* (2013.01); *B29K 2705/08* (2013.01); *B29K 2995/0005* (2013.01); *H05B 2203/017* (2013.01)

(58) Field of Classification Search
  CPC .............. B29C 48/157; B29C 48/2883; B29C 48/2884; B29C 48/34; H05B 2203/017
  See application file for complete search history.

(56) References Cited

U.S. PATENT DOCUMENTS

| | | | |
|---|---|---|---|
| 4,345,368 A | | 8/1982 | Goss et al. |
| 4,392,051 A | | 7/1983 | Goss et al. |
| 4,744,935 A | * | 5/1988 | Priaroggia ............... B29C 48/06 425/114 |
| 6,318,061 B1 | * | 11/2001 | Schneider ............... B29C 48/06 57/7 |
| 2007/0125301 A1 | * | 6/2007 | Zhou .................... B29C 70/521 118/400 |

FOREIGN PATENT DOCUMENTS

| | | | |
|---|---|---|---|
| JP | H0963752 A | | 3/1997 |
| KR | 20130016554 A | | 2/2013 |
| KR | 10-1756119 | * | 7/2017 |
| WO | 8201112 A1 | | 4/1982 |

* cited by examiner

METHOD FOR THE PRODUCTION OF EXTRUDED FILAMENTS WITH CONDUCTIVE ELEMENTS

TECHNICAL FIELD

The present invention relates to the sector of the processes for manufacturing extruded materials.

In particular, the present invention relates to a method and a device for the production of filaments capable of being thermoregulated, specifically suitable for being used to manufacture spiraled pipes capable of being thermoregulated.

STATE OF THE ART

In the industrial sector of extrusion processes, it is common practice to use suitable materials, for example polymeric materials, to manufacture plastic filaments that can therefore be used in a wide range of products.

For example, these filaments can be used as a support for tubular structures, simply by winding, preferably following a spiral path, around them.

The application of the filaments to the structure of a pipe increases its resistance to crushing, leaving its wall flexible enough to allow short-radius curves without it breaking or bending.

The versatility of this type of pipes is highlighted by its applicability in a wide range of different fields such as construction, industrial plants, medical devices, heating systems, home appliances and so on.

Many applications, however, require or are enhanced by the possibility of thermoregulating the volume inside these pipes so as to allow actions on the temperature of the fluids flowing within it modifying it.

Consider, for example, the case where the pipe is adapted to carry fluids inside an industrial plant: it may be useful or even necessary to be able to accurately regulate the temperature at which this fluid is fed to the production process in which it must be used.

In particular, the pipes capable of being thermoregulated of the known type exploit the Joule effect to adjust the temperature of the fluid being flown inside them or can still be based, suitably providing two sufficiently diversified conductive materials, on the exploitation of the Peltier effect or of the Seebeck effect, for example, to measure a temperature.

These pipes have a conductor, typically made in the form of a pair of wires of conductive material positioned within the central lumen of the pipe or in its wall.

The wire could be positioned anywhere but, since the purpose is to heat the internal volume, the greatest effectiveness is achieved if this conductor has the lowest possible insulating mass between itself and the volume to be heated.

In particular, the conductor is made by a pair of wires concurring to make a circuit inside which a current flow flows in turn generating, on the basis of the characteristic resistance of the selected conductive material, the so-called Joule effect with subsequent heat dissipation.

This principle works only in case of presence of a closed circuit inside which the current flow can flow, for this purpose it is therefore necessary that the wires inserted inside the pipe are electrically connected to one of the two common ends and fed to the other end by an electron flow moved by a potential difference between the two.

In some cases, it is provided to insert a wire being folded inside the central lumen, rather than wrapping the folded wire around the pipe itself, as close as possible to the central lumen.

In other cases, the wires are inserted into the molten polymer flow which will form the pipe during its formation and then be joined by a secondary process.

However, the solutions highlighted by the prior art present intrinsic drawbacks making inefficient the production processes of pipes capable of being thermoregulated.

In particular, the insertion of the wire directly inside the pipe can cause problems, as the wire is in direct contact with the fluid flowing inside the pipe.

Alternatively, the application of the filament externally to the pipe, in addition to decreasing its efficiency, introduces the further problem of permanently constraining it to the same, thus introducing an additional process step (assembly) which goes against the productivity of the method in the industrial sector.

If, on the other hand, the conductor is immersed in the side walls of the pipe, the prior art envisages introducing into the market pipes with no electrical connection, leaving to the end user the task of realizing it.

OBJECT OF THE INVENTION

In this context, the technical task underlying the present invention is to propose a method and a device for extruding filaments capable of being thermoregulated that overcomes at least some of the drawbacks of the known art mentioned above.

In particular, it is an object of the present invention to provide a method and device for the extrusion of filaments capable of being thermoregulated able to optimize the production process, in particular when used for the realization of spiraled pipes capable of thermoregulating the volume therein by exploiting the Joule effect.

The specified technical task and the objects specified are substantially achieved by a method and a device for the extrusion of filaments capable of being thermoregulated (as well as, in functional and procedural coordination, by a method and device for the production of articles containing such filaments capable of being thermoregulated) comprising the characteristics techniques set out in one or more of the appended claims. According to the present invention, a method is shown for the production of filaments capable of being thermoregulated which essentially comprises the steps of:

feeding a material to be extruded and a pair of wires in electrically conductive material to an extrusion head;

extruding the material to be extruded and, at the same time, promoting the escape of the pair of wires from the extrusion head in such a way that the material to be extruded winds the pair of wires;

during the extrusion, generating at least a coupling portion of the filament, wherein the pair of wires is electrically connected.

Operationally, the method can also include the following additional steps:

extruding, preferably in the axial and/or periodic direction (i.e. along the co-extrusion axis and/or at predetermined axial intervals), the pair of wires (B) outside the material to be extruded;

cyclically repeating all just-mentioned steps, so as to define at least two co-extruded articles made respectively in each cycle of cyclically repeated steps; and defining and/or leaving an axial gap between two articles being successively co-extruded one after the other in successive cycles, said axial gap being sufficient for a cutting operation suitable to separate said two co-extruded articles not to interrupt a circuit created by said coupling portion (Y) of the filament (A), wherein said pair of wires (B) is electrically connected.

Preferably, during the step of generating at least one coupling portion, the pair of wires is twisted so as to present at least one mutual contact point arranged to electrically connect them.

Alternatively, during the step of feeding at least one material to be extruded, a mixing thereof is carried out with an electrically conductive additive in powder form, and during the step of generating at least one coupling portion, the filament is locally compressed so as to compact the additive until the same assumes a density being sufficient to generate an electrical contact between the wires.

Preferably, after the mixing step, the material to be extruded is composed of an additive for a percentage in the range between 25% and 35%.

Advantageously, the disclosed method overcomes the drawbacks of the prior art, providing a simple and efficient method for producing a filament capable of being thermoregulated having therein a closed circuit which allows the passage of current and therefore the occurrence of the Joule effect.

In this way, the filament can be immediately used for the realization of a product, without it being necessary for the end user to make any changes in order to make it operational and usable.

The present invention also relates to a method for the production of spiraled pipes capable of being thermoregulated which comprises the steps of:

extruding an elongated tape having opposite side edges;
winding the elongated tape in a helical manner such that the opposite side edges overlap, steadily constraining said opposite side edges to realize a helical junction area realizing a tubular body;
extruding a filament capable of being thermoregulated according to one or more of the preceding claims;
winding the filament capable of being thermoregulated around the tubular body, preferably overlapping it on the helical junction area.

Preferably, the steps of extruding an elongated tape and extruding a filament capable of being thermoregulated are performed simultaneously.

Preferably, the steps of winding the tape and the filament are performed simultaneously.

Advantageously, the disclosed method of production of spiraled pipes capable of being thermoregulated allows to realize pipes capable of thermoregulating the volume therein by exploiting the Joule effect, without the heating element coming into contact with the fluid flowing through the pipe and without requiring the end user to undertake preparatory work aimed at making the pipe operative.

The present invention also relates to an extrusion head comprising:

a first nozzle which can be connected to at least one propeller, in order to receive from it a material to be extruded; the first nozzle is configured to extrude the material along an extrusion direction;
an insertion device configured to receive in feed a pair of wires in electrically conductive material and having a pair of delivering seats arranged to deliver respective wires along the extrusion direction.

Preferably, the first nozzle is associated with the insertion device so as to extrude the material to be extruded around the pair of wires exiting the extrusion head by completely winding them.

Alternatively to the aforementioned embodiment, it can also be noted that if one or both of the wires belonging to the pair (B) were suitably insulated, they can be inserted in different relative positions with respect to the material to be extruded, or in different geometric/topological positions of a given co-extruded article suitably formed (for example, under a "strap" and inside the passage lumen of a spiraled article or in any case provided with a main cylindrical body provided with axial or helical ribs inside it or on the outside, or inside the strap, between the strap and the so-called "rib" or even inside the rib or possibly outside the rib itself).

Preferably the first nozzle and the insertion device are coaxial.

Even more preferably, the first nozzle is arranged around the insertion device.

In particular, the first nozzle has a circular extrusion profile which is circumferential to the insertion device.

Preferably, the delivering seats are movable in rotation about an axis being parallel to the extrusion direction so as to cause a twisting of the wires exiting the extrusion head.

Alternatively, the dispensing seats are movable along a transverse path to the extrusion direction so as to cause a twisting—or more generally an intersection (or an "intersection with contact" if desired)—of the wires exiting the extrusion head.

Preferably, the extrusion head comprises a compression device configured to act on the filament capable of being thermoregulated exiting the extrusion nozzle by compressing it locally.

The extrusion head may also include a second nozzle which can be connected to at least one propeller to receive from it a material to be extruded and configured to extrude an elongated tape having opposite side edges.

Preferably, the first nozzle and the second nozzle are coupled to define an extrusion nozzle having a first portion suitable for extruding the filament capable of being thermoregulated and a second portion suitable for extruding the tape.

The extrusion head may also include a spindle configured to promote a winding of the elongated tape and of the filament capable of being thermoregulated in such a way that the opposite side edges overlap to form an area of helical junction realizing a tubular body and of said filament capable of being thermoregulated around the tubular body.

Further characteristics and advantages of the present invention will become more apparent from the description of an exemplary, but not exclusive, and therefore non-limiting preferred production of a method and device for extruding filaments capable of being thermoregulated, as illustrated in the appended drawings, wherein:

DETAILED DESCRIPTION OF PREFERRED EMBODIMENTS OF THE INVENTION

The present invention relates to a method for the production of filaments "A", in particular of the type capable of being thermoregulated.

The term "capable of being thermoregulated" means that the filament "A" has characteristics and structure allowing the heat generation in a controlled manner.

In particular, this result is obtained thanks to the presence inside the filament "A" of an electrically conductive material, which is capable of generating heat due to the Joule effect.

That is to say that it is possible to vary a heat emitted by the filament capable of being thermoregulated by varying the electric current flowing inside it, so as to control the amount of power dissipated by the Joule effect.

In particular, the method of the present invention provides to feed a material to be extruded to an extrusion head 1 which will be disclosed in greater detail below.

For the purposes of the present description, the generic term "material to be extruded" refers to any known material suitable to be used in the field of extrusion processes, for example plastics, polymers or other materials which present at the same time characteristics of electrical insulation.

At the same time, a pair of wires "B" of electrically conductive material is fed to the same extrusion head 1.

The material to be extruded is then extruded promoting, at the same time, the escape of the pair of wires "B" from the extrusion head 1, in such a way that the material to be extruded forms the filament "A" around a pair of wires "B" by completely winding them.

In other words, the wires "B" turn out to be (in an exemplifying but of course non-limiting embodiment according to the present invention) completely immersed and enclosed within the filament "A".

During the extrusion process, it is provided at least one coupling portion "Y" of the filament "A" wherein said pair of wires "B" is electrically connected.

In other words, the wires "B" are fed to the extrusion head 1 independently of one another and will respectively represent two distinct branches of the electric circuit to be produced inside the filament "A" in order to allow the passage of current.

During the extrusion, the circuit is then closed by realizing the at least one coupling portion "Y", wherein an electrical connection is generated between the two wires "B", which allows the transmission of charge carriers, and therefore the passage of current, between the two.

Figure 1:
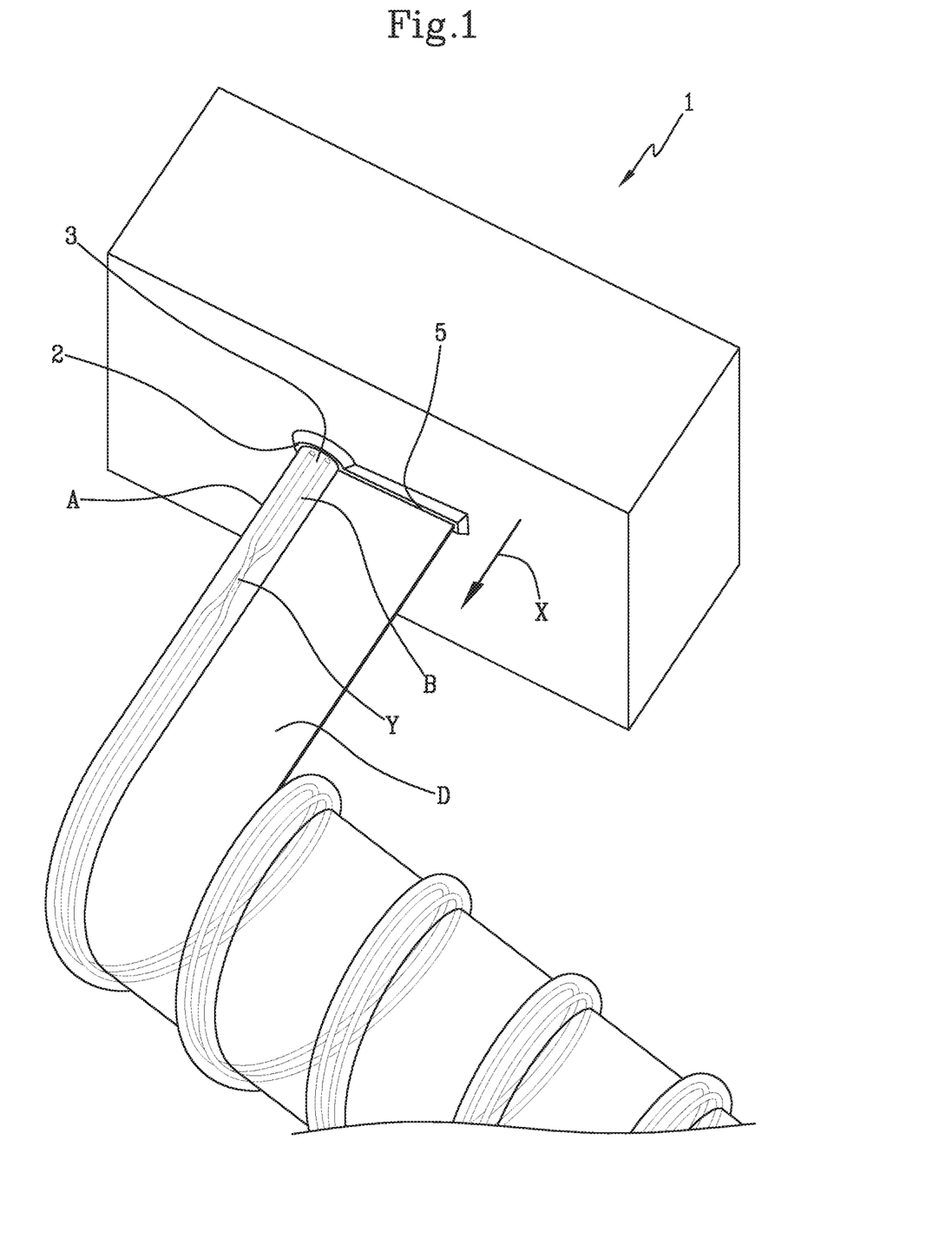
FIG. 1 schematically shows a view of an extrusion head during the production of a spiraled pipe capable of being thermoregulated.
Figure 2A:
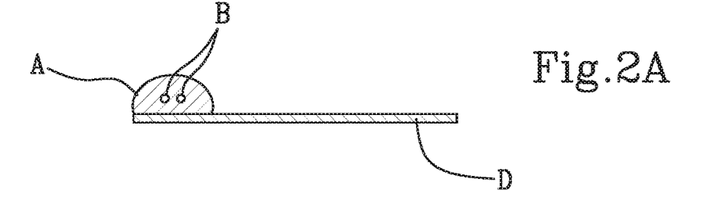
FIGS. 2A-2E show cross-sectional views with respect to an extrusion direction of some production steps of the spiraled pipe capable of being thermoregulated.
Figure 2B:
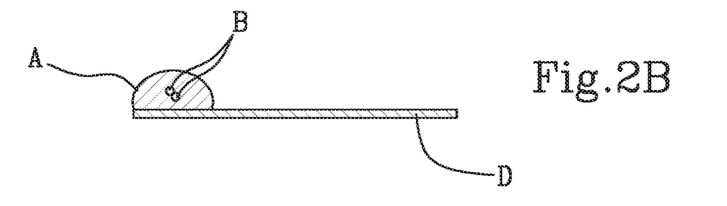
Figure 2C:
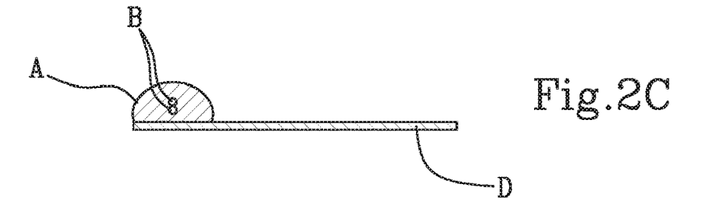
Figure 2D:
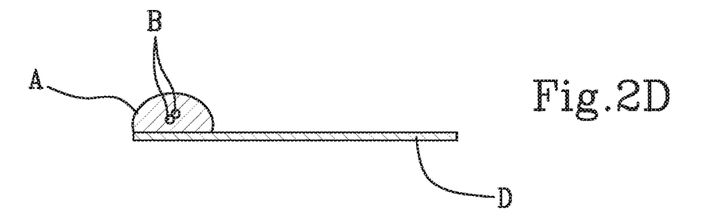
Figure 2E:
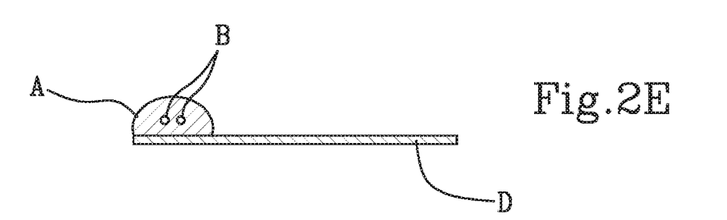
Figure 3A:
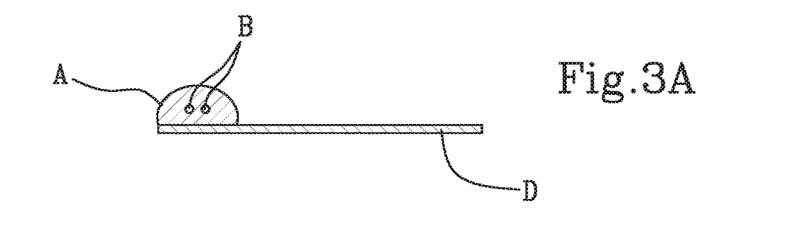
FIGS. 3A-3E show cross-sectional views with respect to an extrusion direction of some production steps of the spiraled pipe capable of being thermoregulated according to a further embodiment.
Figure 3B:
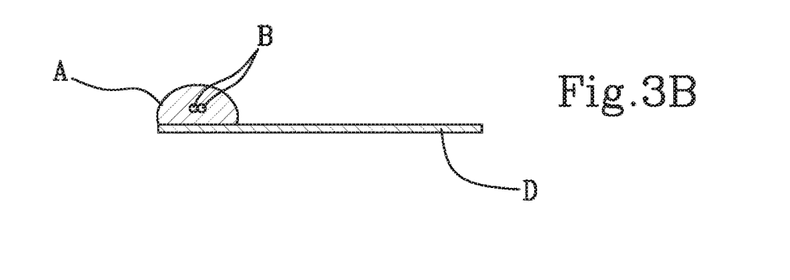
Figure 3C:
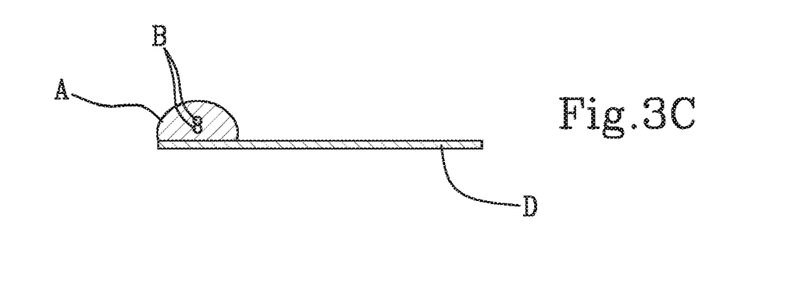
Figure 3D:
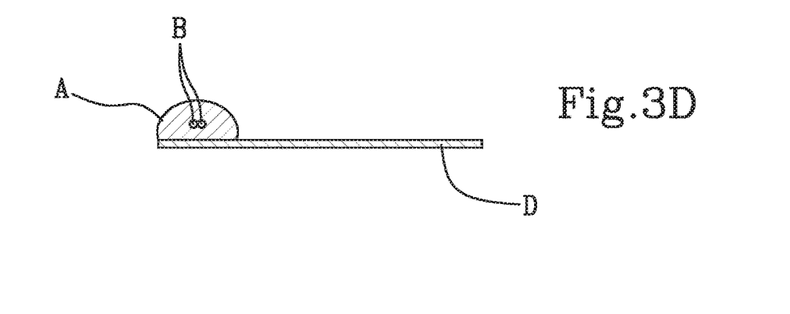
Figure 3E:
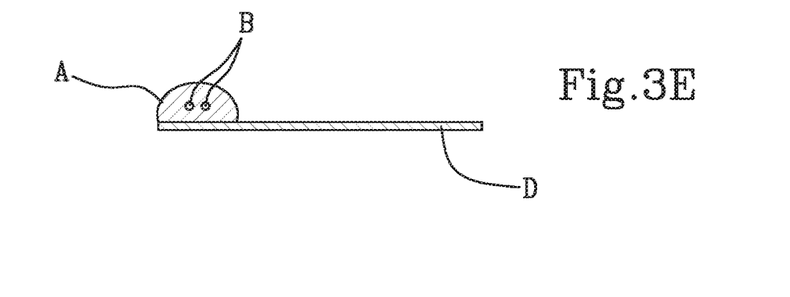

According to a first possible embodiment, shown in FIG. 1 and with greater detail in FIGS. 2A-2E and FIGS. 3A-3E, the generation of the electrical contact portion provides the twisting of the pair of wires "B" so as to realize at least one mutual contact point arranged to electrically connect them.

In other words, according to this embodiment, the position of the wires "B" inside the filament "A" is changed during extrusion so that the wires "B" are progressively brought closer until they come into mutual contact in correspondence with the coupling portions "Y".

Figure 4A:
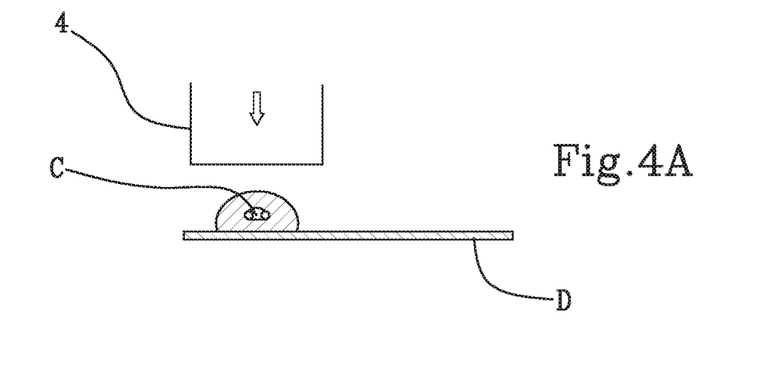
FIGS. 4A-4C show cross-sectional views with respect to an extrusion direction of some production steps of the spiraled pipe capable of being thermoregulated according to a further embodiment.
Figure 4B:
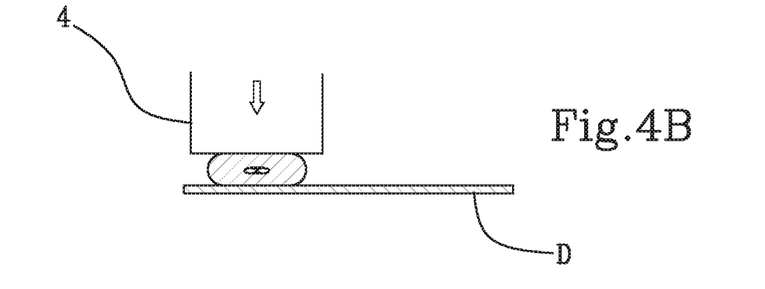
Figure 4C:
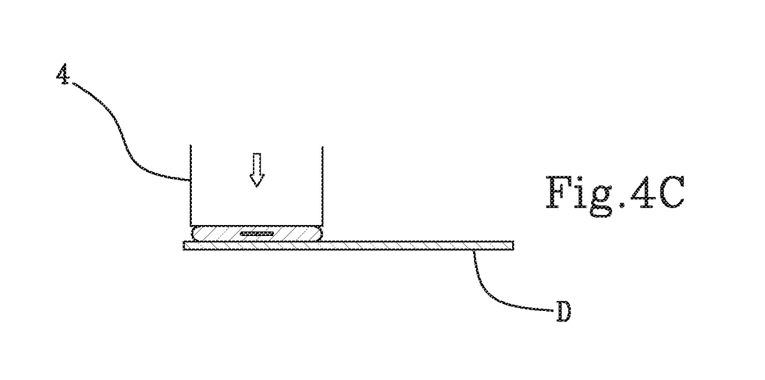
Figure 5A:
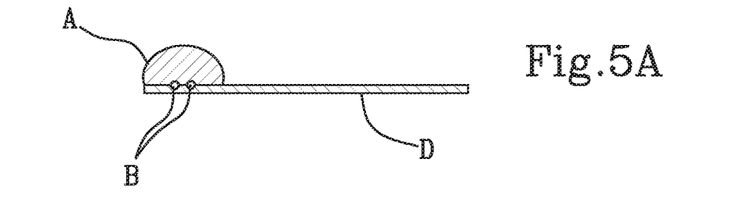
FIGS. 5A-5F show cross-sectional views with respect to an extrusion direction of some production steps of the spiraled pipe capable of being thermoregulated according to a further embodiment.
Figure 5B:
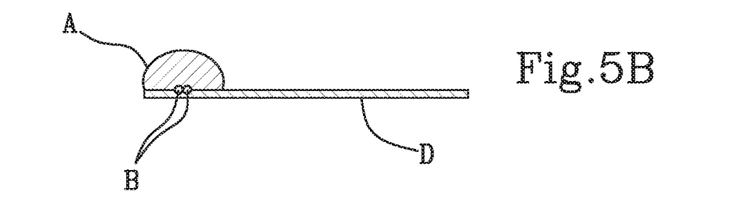
Figure 5C:
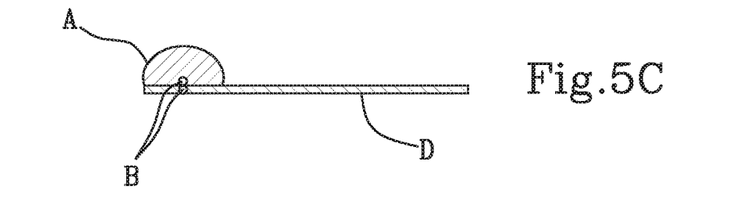
Figure 5D:
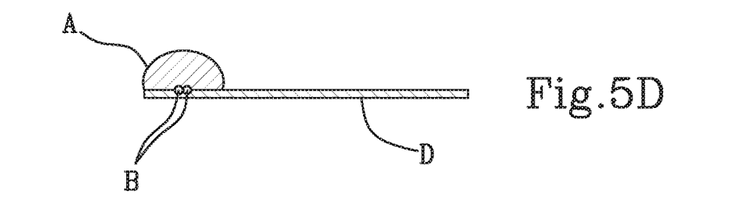
Figure 5E:
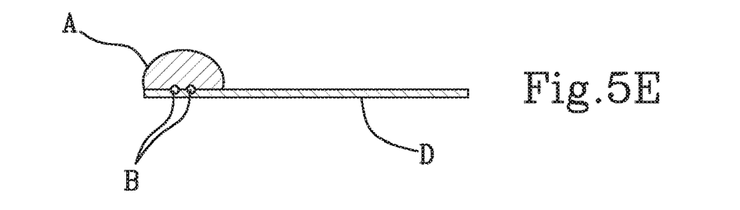
Figure 5F:
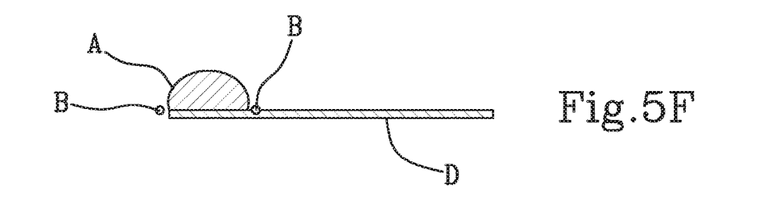
Figure 6A:
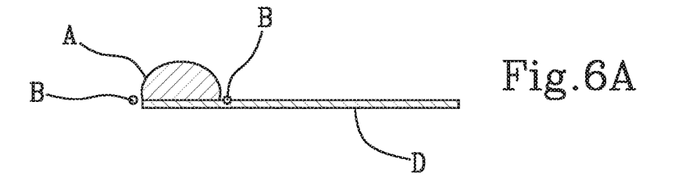
FIGS. 6A-6F show cross-sectional views with respect to an extrusion direction of some production steps of the spiraled pipe capable of being thermoregulated according a further embodiment.
Figure 6B:
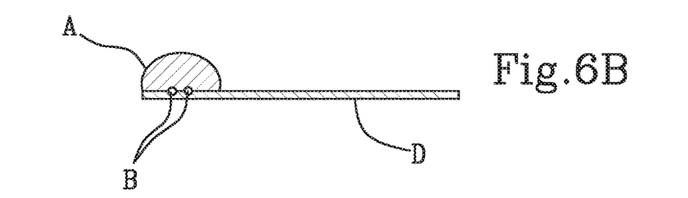
Figure 6C:
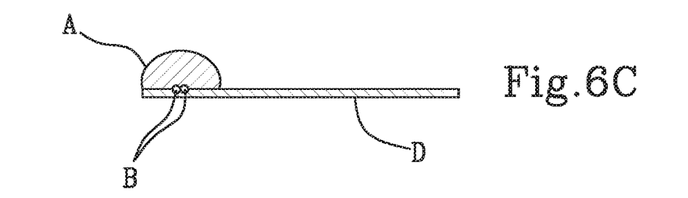
Figure 6D:
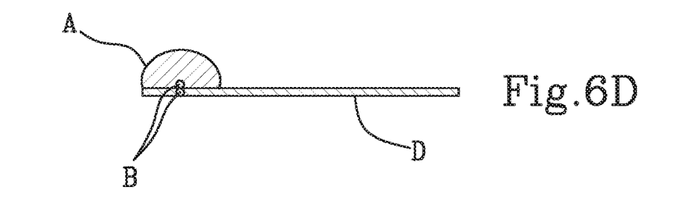
Figure 6E:
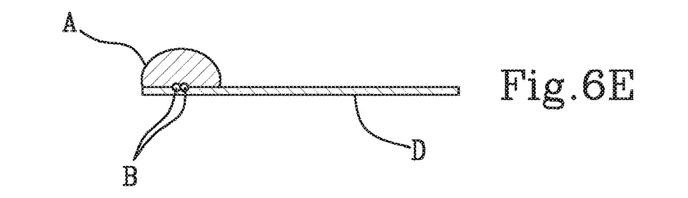
Figure 6F:
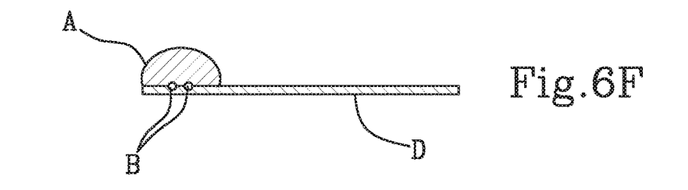

Alternatively, according to a further possible embodiment, shown schematically in FIGS. 4A-4C, the generation of the coupling portion "Y" does not occur by the approach of the wires "B" to make a mutual contact, but by short-circuiting the two by a deformation of the filament "A".

In particular, according to this embodiment, the step of feeding the material to be extruded to the extrusion head further provides to mix with it an electrically conductive additive "C" in powder form (or an electrically conductive polymer such as polyaniline or polyacetylene) in such a way that the additive "C" is dispersed within the filament.

The term "in powder form" means that the additive is in a granular or in any case discrete form, with grains of a size suitable for determining a homogeneous dispersion of the additive inside the matrix of the material to be extruded, once this is extruded to make the filament "A".

It should be noted that the expression "granular form", introduced above, is intended to mean a state of aggregation of the additive which has a plurality of solid corpuscles or in any case with an individual density comparable to the solid state: such corpuscles can then have the most disparate geometric configurations and/or the most disparate chemical compositions, such as leaves, needles, pipes, nanopipes and so on (such granules can then be made by way of example of, but not limited to, graphene, metal or carbon fibres and anything else depending on the needs of the moment).

The generation of the at least one coupling portion "Y" will then be obtained by compressing a portion of the filament in such a way as to compact the additive "C" until an electrical contact is generated between the wires "B".

In other words, the additive "C" dispersed within the filament "A" does not have per se a sufficient density to allow the passage of charge carriers, however, as a result of compression, the particles of the additive "C" are compacted by approaching until obtaining a volumetric density being sufficient to allow locally a flow of charge carriers, thus short-circuiting the two wires "B" in correspondence of the coupling portion "Y" where the compression occurred.

Preferably, the material to be extruded has a percentage of additive "C" therein in the range between 25% and 35%, so as to guarantee a sufficient quantity of additive "C" for the generation of electrical contact between the wires "B" following the compression, without compromising at the same time the mechanical and structural characteristics.

The filament "A", produced by the present invention, thus allows to control an amount of heat generated by the Joule effect from the flowing of an electric current inside the wires "B" producing a closed circuit, thanks to the arrangement of the coupling portions which are precisely designed to generate an electrical contact of the pair of wires "B".

It is worth noting that by implementing, with the present method, an embodiment of a co-extruded article wherein the two wires of the pair "B" are of different metals (for example: copper and constantan, nickel and chromium, platinum and rhodium, and anything else depending on the needs of the moment), it is advantageously possible to create a thermocouple. In addition, the combination (by means of the co-extrusion) of a first pair of wires of the same conductive metal and of a second pair of wires which are metallically different from one another, together with an operative step of giving suitable coupling of these pairs at an electrical/circuit level, would allow to obtain a closed-loop thermoregulator device (wherein, the current with consequent generation of the Joule effect circulates in the first pair of wires, and wherein the second pair of wires acts as a regulator/selector on the passage of the same current).

The present invention also relates to a method for the production of a spiraled pipe capable of being thermoregulated, that is to say pipes which allow to accurately adjust the temperature of the fluid that flowing inside them, providing more or less heat generable by the Joule effect, varying the characteristics of the electric current flowing therein.

In particular, the method provides the extrusion of an elongated tape "D" having opposite side edges.

The tape "D" is then wound up according to a helical or spiral path, so that the opposite side edges overlap to form an area of helical junction.

In this way a tubular body is made.

In other words, the pipe is formed by winding the extruded tape "D" along a spiral path, so as to obtain an at least partial overlap of the opposite side edges of the tape "D" which are then constrained to each other.

The realization of the area of helical junction, i.e. that portion of the tubular body wherein the opposite side edges of the tape "D" are overlapped and mutually constrained, is preferably carried out when the extruded material is still not completely cooled and solidified, so as to allow that the opposite side edges are welded together.

The method also provides for extruding a filament "A" capable of being thermoregulated according to the above description.

That is to say that it is extruded a filament "A" having therein a pair of electrically conductive wires "B" and at least a coupling portion "Y" suitable for generating an electrical contact between the two wires "B" of the pair.

The filament "A" is then coupled to the tubular body by winding it helically around it, preferably by overlapping it on the area of helical junction.

In this way, the wire is placed directly in contact with the tubular body and is permanently connected thereto, so that it can transmit by conduction the heat generated by the dissipation of the electric power generated therein by the passage of current inside the circuit defined by the pair of wires "B".

Advantageously, by overlapping and constraining the filament "A" to the area of junction, it is possible to further tighten the coupling generated between the opposite side edges which define the area of junction itself, making more resistant the spiral pipe capable of being thermoregulated.

According to a preferred embodiment, the extrusion of the filaments "D" and "A" is carried out simultaneously.

In other words, it is possible to realize at the same time, preferably by means of a same extrusion head, both the filaments "D" and "A".

In the same way, it is possible to simultaneously execute the winding step of the tape "D" to make the tubular body and the winding step of the filament "A" around it simultaneously.

It is observed that the winding steps can be carried out simultaneously even if the extrusion steps are carried out separately, i.e. It is possible to realize the spiraled pipe capable of being thermoregulated by simultaneously winding the tape "D" and the filament "A" to realize the pipe, even if these components have been extruded at different times.

The present invention also relates to an extrusion head.

In FIG. 1, the numerical reference 1 generically indicates an extrusion head configured for the production of a filament "A" capable of being thermoregulated starting from a material to be extruded.

The extrusion head disclosed herein is particularly suitable for carrying out the above-disclosed method and comprises a first nozzle 2 and an insertion device 3.

The first nozzle 2 can be connected to at least one propeller of the known type (not shown in the attached figures) which receives the material to be extruded from a tank, a hopper or any other container suitable for storing a material to be extruded and feeding it to the extrusion head 1.

The first nozzle 2 is then fed by at least one propeller and is configured to generate the filament "A" along an extrusion direction "X".

The insertion device 3 is instead configured to receive in feed a pair of wires "B" in electrically conductive material, such as for example copper or other suitable conductive metals and has a pair of delivering seats arranged to deliver respective wires "B" exiting from the extrusion head 1.

In other words, the wires "B" are fed to the insertion device 3, and in particular they are passed through respective delivering seats which allow it to be transferred to the extrusion head 1, in particular along the extrusion direction "X".

The extrusion nozzle 2 is associated with the insertion device 3, in such a way that the material to be extruded is processed realizing the filament "A" around the pair of wires "B" completely winding them.

In particular, the extrusion nozzle 2 and the insertion device 3 are coaxial, preferably the extrusion nozzle 2 has a circular profile arranged around the insertion device 3.

According to a first embodiment, some configurations of use of which are shown in FIGS. 2A-2E, the delivering seats are movable in rotation about an axis being parallel to the extrusion direction "X" so as to cause a twisting of the wires exiting the extrusion head.

In other words, it is possible to rotate the delivering seats while simultaneously executing the extrusion aimed at making the filament "A".

The tension to which the wires "B" are subjected and the consequent friction with the extruded material not yet completely solidified exiting from the extrusion head 1, allow to firmly fix the contact point of the two wires "B" in the coupling portion "Y", where it is thought to be provided according to the technical specifications of the filament "A2" to be produced.

Alternatively, as shown in FIGS. 3A-3E, the delivering seats are movable along a transverse direction to the extrusion direction "X" so as to cause a twisting of the wires exiting the extrusion head.

In other words, the delivering seats move alternately between respective starting and ending positions, wherein the starting position of a seat corresponds to the arrival position of the other seat and vice versa.

According to this embodiment, it is therefore present an intermediate position, wherein the two delivering seats will substantially change position.

According to a further possible embodiment, shown schematically in FIGS. 4A-4C, the extrusion head 1 comprises a compression device 4 configured to act on the filament "A" capable of being thermoregulated exiting the extrusion nozzle 2 by compressing it locally.

In particular, this embodiment can be advantageously used when the material to be extruded is mixed with an electrically conductive additive "C" in a percentage in the range between 25% and 35%, so that the compression generated by the compression device 4 allows to thicken the additive "C" until the coupling portion "Y" is generated by placing the two wires "B" in electrical connection.

The extrusion head 1 of the present invention can also be arranged for the realization of a spiraled pipe capable of being thermoregulated, in particular according to the above-outlined method.

To this end, the extrusion head 1 includes a second nozzle 5 which can be connected to at least one propeller to receive from it a material to be extruded and configured to extrude an elongated tape "D" having opposite side edges.

Advantageously, the first nozzle 2 and the second nozzle 5 can be made by means of a single element having an extrusion profile suitable for simultaneously producing the filament "A2" capable of being thermoregulated and the tape "D".

Likewise, the first nozzle 2 and the second nozzle 5 can be fed and operated by means of the same propeller.

The extrusion head may also include a rotating spindle configured to promote a helical winding of the elongated tape "D" and of the filament capable of being thermoregulated in such a way that the opposite side edges overlap to form an area of helical junction realizing a tubular body. Consequently, the filament "A" capable of being thermoregulated will be wounded around the tubular body.

Advantageously, the extrusion head 1 of the present invention allows to produce filaments "A" capable of being thermoregulated and/or spiraled pipes capable of being thermoregulated wherein the electric circuit designed to generate the Joule effect is completely formed and integral to the structure of the realized product, therefore without requiring further processing steps by the end user.

From the point of view of the advantages, it must therefore be observed that the present invention allows to realize both the "filaments" suitably connected from the electrical and/or circuit point of view, and a wide range of articles (including these filaments capable of being thermoregulated) which for example can be profiles (extruded), pipes, straps or tapes.

At the same time, the invention allows to place the wires/filaments between elements which are combined in different ways with the structure of the articles: for example, in the case of realization of a "spiraled" product the filaments can be arbitrarily positioned between the helical thickening that composes the "rib" of the spiraled article and the below cylindrical body (and no longer only "inside" the helical thickening, as occurs in the production methods of known art), or even in the cylindrical body of the spiraled article or even under the latter (this last embodiment variant can be implemented by taking advantage of the crushing "from below" enforceable to all that is co-extruded during the implementation of the method itself).

The considerable variability of configurations and/or relative positions between the material constituting the extruded body and the filaments ultimately allows to generate an important advantage, namely that of having the heating element closer to the content in transit through the article (e.g. a fluid to be heated which must pass through a tubular article produced according to the method of the invention).

Furthermore, it can be noted that the possibility of twisting—and therefore of "bridging" or short-circuiting the wire—is obtained through different types of physical phenomena that can be exploited during the co-extrusion according to the present method: for example, in is possible to take advantage of the friction between the forming element (i.e. the spindle of the co-extruder) and the material, for example polymeric material, which is deposited thereon and then welded with the next coil in an embodiment of a spiraled article.

The invention claimed is:

1. A method for the production of filaments capable of being thermoregulated comprising the steps of:
   feeding a material to be extruded to an extrusion head;
   feeding a pair of wires of electrically conductive material to said extrusion head;
   extruding the material to be extruded along an extrusion direction and, at the same time, promoting the escape of the pair of wires from the extrusion head in a spaced apart manner, and in such a way that the material to be extruded encapsulates said pair of wires to make a filament;
   generating, during the step of extruding, a first coupling portion of the filament wherein a first wire and a second wire of the pair of wires come into direct contact with one another with no intervening elements to that the pair of wires is electrically connected, wherein said first coupling portion is formed locally and is adjacent in the extrusion direction to a second portion of the filament wherein the pair of wires is again in the spaced apart manner, and wherein said first coupling portion is arranged within the material to be extruded.

2. The method according to claim 1, further including a step of ejecting, in an axial and/or periodic direction, at least a portion of the pair of wires outside the material to be extruded.

3. The method according to claim 1, further including a step of cyclically repeating all the steps of claim 1, said step of cyclically repeating being adapted to define at least two co-extruded articles made respectively in each cycle of steps.

4. The method according to claim 3, further including a step of defining and/or leaving an axial gap between two articles being successively co-extruded one after the other in successive cycles, said axial gap being sufficient for a cutting operation suitable to separate said two co-extruded articles not to interrupt a circuit created by said coupling portion of the filament, wherein said pair of wires is electrically connected.

5. The method according to claim 1, wherein said step of generating the first coupling portion comprises a step of twisting the pair of wires in such a way that said pair of wires has at least one mutual contact point suitable to electrically connect them.

6. The method according to claim 1, wherein the step of feeding a material to be extruded comprises a step of mixing with said material to be extruded an electrically conductive additive preferably in powder form, such that said additive is dispersed inside the filament and said step of generating the first coupling portion comprises a step of compressing a portion of the filament so as to compact the additive increasing its volumetric density until generating an electrical contact between the wires.

7. The method according to claim 6, wherein after the step of mixing, the material to be extruded is composed of an additive in a percentage in the range between 25% and 35%.

8. A method for the production of spiraled tubes capable of being thermoregulated comprising the steps of:
   extruding an elongated tape having opposite side edges;
   winding said elongated tape in such a way that the opposite side edges overlap, steadily constraining said opposite side edges to realize a helical junction area realizing a tubular body;

extruding a filament capable of being thermoregulated according to the method according to claim 1;

winding said filament capable of being thermoregulated around said tubular body, preferably overlapping said filament capable of being thermoregulated on the area of helical junction.

9. The method according to claim 8, wherein the steps of extruding an elongated tape and extruding a filament capable of being thermoregulated are performed simultaneously and the steps of winding said tape and winding said filament are performed simultaneously.

10. An extrusion head comprising:

a first nozzle configured to be connected to at least one propeller to receive from said propeller a material to be extruded and configured to extrude said material along an extrusion direction;

an insertion device configured to receive in feed a pair of wires in a spaced apart manner in electrically conductive material and having a pair of delivering seats arranged to deliver respective wires of the pair of wires along the extrusion direction, wherein the extrusion head is configured to form a first coupling portion so that a first wire and a second wire of the pair of wires come into direct contact with one another with no intervening elements, wherein the coupling portion is formed locally on the pair of wires during extrusion, wherein the first couplig portion is adjacent in the extrusion direction to a second portion wherein the pair of wires is again in the spaced apart manner;

said first nozzle being associated with the insertion device so as to extrude the material to be extruded around the pair of wires exiting the extrusion head by completely encapsulating them.

11. The extrusion head according to claim 10, wherein the first nozzle and the insertion device are coaxial, said first nozzle being disposed circumferentially around the insertion device.

12. The extrusion head according to claim 10, wherein said delivering seats are movable in rotation about an axis being parallel to the extrusion direction so as to cause a twisting of the wires exiting the extrusion head.

13. The extrusion head according to claim 10, wherein said delivering seats are movable along a path being transverse to the extrusion direction so as to define a twisting of the wires exiting the extrusion head.

14. The extrusion head according to claim 10, further comprising a compression device configured to act on the filament capable of being thermoregulated exiting from the first nozzle by compressing it locally.

15. The extrusion head according to claim 10, comprising:

a second nozzle which can be connected to at least one propeller to receive from said propeller a material to be extruded and configured to extrude an elongated tape having opposite side edges; and a spindle configured to promote a winding of the elongated tape and said filament capable of being thermoregulated in such a way that said opposite side edges overlap to form an area of helical junction realizing a tubular body and of said filament capable of being thermoregulated around the tubular body.

\* \* \* \* \*